(12) United States Patent
Wittmann et al.

(10) Patent No.: US 6,479,793 B1
(45) Date of Patent: Nov. 12, 2002

(54) METHOD FOR CONTROLLING A WELDING APPARATUS AND CORRESPONDING CONTROL DEVICE

(75) Inventors: Manfred Wittmann, Rutzenmoos (AT); Franz Niedereder, Fischlham (AT); Helmut Friedl, Sipbachzell (AT)

(73) Assignee: Fronius Schweissmaschinen Produktion GmbH & Co. KG, Pettenbach (AT)

( * ) Notice: Subject to any disclaimer, the term of this patent is extended or adjusted under 35 U.S.C. 154(b) by 0 days.

(21) Appl. No.: 09/700,395

(22) PCT Filed: May 14, 1999

(86) PCT No.: PCT/AT99/00122
§ 371 (c)(1), (2), (4) Date: Nov. 11, 2000

(87) PCT Pub. No.: WO99/58286
PCT Pub. Date: Nov. 18, 1999

(30) Foreign Application Priority Data

May 13, 1998 (AT) .............................................. A825/98

(51) Int. Cl.[7] .............................................. B23K 9/095
(52) U.S. Cl. ................................................. 219/130.5
(58) Field of Search ........................ 219/130.5, 130.21, 219/130.31, 130.32, 130.33, 137 PS; 901/42

(56) References Cited

U.S. PATENT DOCUMENTS 5,571,431 A 11/1996 Lantieri et al.
6,096,994 A * 8/2000 Handa et al. ............ 219/130.5
6,177,650 B1 * 1/2001 Watanabe et al. ........ 219/130.5

FOREIGN PATENT DOCUMENTS

| DE | 297 15 999 | 4/1998 |
| EP | 0 865 858 | 9/1998 |
| RU | 1787090 A3 | 1/1993 |

OTHER PUBLICATIONS

Koizumi et al., "Development and Site Application of an Automatic Welding system for Pipelines", Welding International, vol. 2, No. 11, 1988, pp. 1012–1017, XP000000564.

* cited by examiner

Primary Examiner—Clifford C. Shaw
(74) Attorney, Agent, or Firm—Collard & Roe, P.C.

(57) ABSTRACT

The invention describes a method of controlling a welding unit (1) and a current source (2), in which various welding parameters, such as a welding current, a welding wire diameter, a welding method etc., for example, can be set by a user from an input and/or output device (22). The welding unit (1) and the current source (2) are then activated by the control device (4) in accordance with the predetermined welding parameters, different desired values being stored in a memory device for the different welding parameters. The desired values for at least one welding parameter of a welding method are stored in the memory device for the minimum and maximum values in the form of a minimum and maximum curve and when a welding parameter falling between the minimum and maximum values or curves is retrieved or set, the control device (4) determines the other desired values of the other welding parameters of this welding process by means of a computing method, in particular by means of an interpolation calculation.

11 Claims, 5 Drawing Sheets

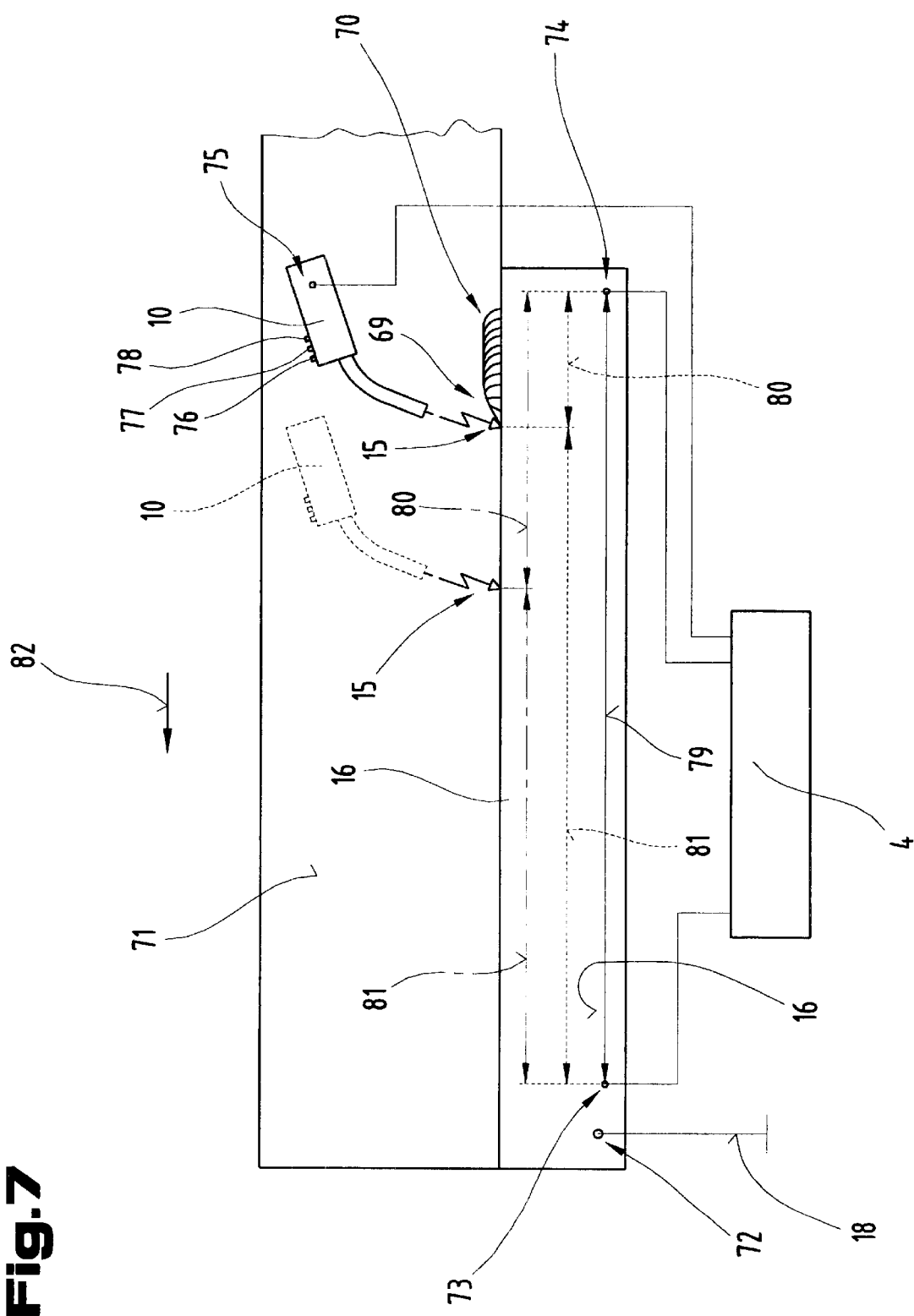

METHOD FOR CONTROLLING A WELDING APPARATUS AND CORRESPONDING CONTROL DEVICE

The invention relates to a method for controlling a welding unit and a current source, as well as a control device for a welding unit.

Methods for controlling welding units and current sources and a device required for this purpose are known, which enable different welding parameters, such as a welding current, an additional material, a welding method, for example, etc., to be set from an input and/or output device, so that a control device can control the individual components of the welding unit accordingly on the basis of the pre-set welding parameters enabling a user to perform a corresponding welding process.

The underlying objective of this invention is to propose a method of controlling a welding unit and current source as well as a device, whereby welding parameters can be easily entered or edited to enable a welding process to be configured and performed accordingly.

This object is achieved with a method in which various welding parameters can be set by a user via an input or output device, the set welding parameters being applied to a control device, after which the welding unit and the current source are activated by the control device in accordance with the pre-set welding parameters. Various desired values for the different welding parameters being stored in a memory device, read by the control device and displayed on the input or output device when a welding method is retrieved. The desired value for at least one welding parameter of a welding method are stored in the memory device for the minimum and maximum values in the form of a minimum and maximum curve to create a three-dimensional characteristic curve and, when a welding parameter falling between the minimum and maximum values or curves is retrieved or set, the control device determines the other desired values of the other welding parameters of this welding method by means of an interpolation calculator. The advantage of this arrangement is that by storing a minimum and a maximum curve for a welding process, only a small memory capacity is required, which means that a plurality of different curves for different welding processed can be stored in a welding unit. Another advantage resides in the fact that by interleaving or deriving several welding parameters from one welding parameter by a simple computing method, in particular an interpolation computation method, every value of a welding parameter or every welding parameter can be determined but the user can preset individual or a few welding parameters to which the other welding parameters will be adjusted so that user-defined welding parameters can be applied to the computation of the weld seam and individual welding parameters in order to produce a corresponding weld seam.

Further advantages can be taken from the detailed drawings.

The invention also relates to a control device for a welding unit.

This control device comprises an input or output device connected to the control device, a memory device for storing operating data and a power component, desired values being stored in the memory device of the welding unit for the purpose of setting up a welding parameter or a welding process. The desired values are adjustable via the input or output device when retrieved or activated, and the desired values are made up of a plurality of minimum and maximum curves to create a three-dimensional characteristic curve. The advantage of this arrangement is that a large number of different minimum and maximum curves can be used for different welding processes but only a small memory capacity is required. Another advantage is that the other welding parameters needed for the different settings of a welding process can be calculated by means of a simple computing method, in particular an interpolation computation method, thereby producing a three-dimensional characteristic curve for a welding method. Yet another advantage is that by pre-setting minimum values and maximum values, incorrect computations can be ruled out because the minimum values and the maximum values simultaneously serve as threshold values for a possible welding configuration of the welding unit, which means that an error signal can be issued by the control device in the event of a drop below or rise above a threshold value and the user can re-set the welding unit.

The invention will be described in more detail below with reference to the appended drawings illustrating various embodiments.

Of these:

FIG. 7 is a simplified, schematic chart illustrating how the welding speed of a welding torch of the welding unit is detected.

Figure 1:
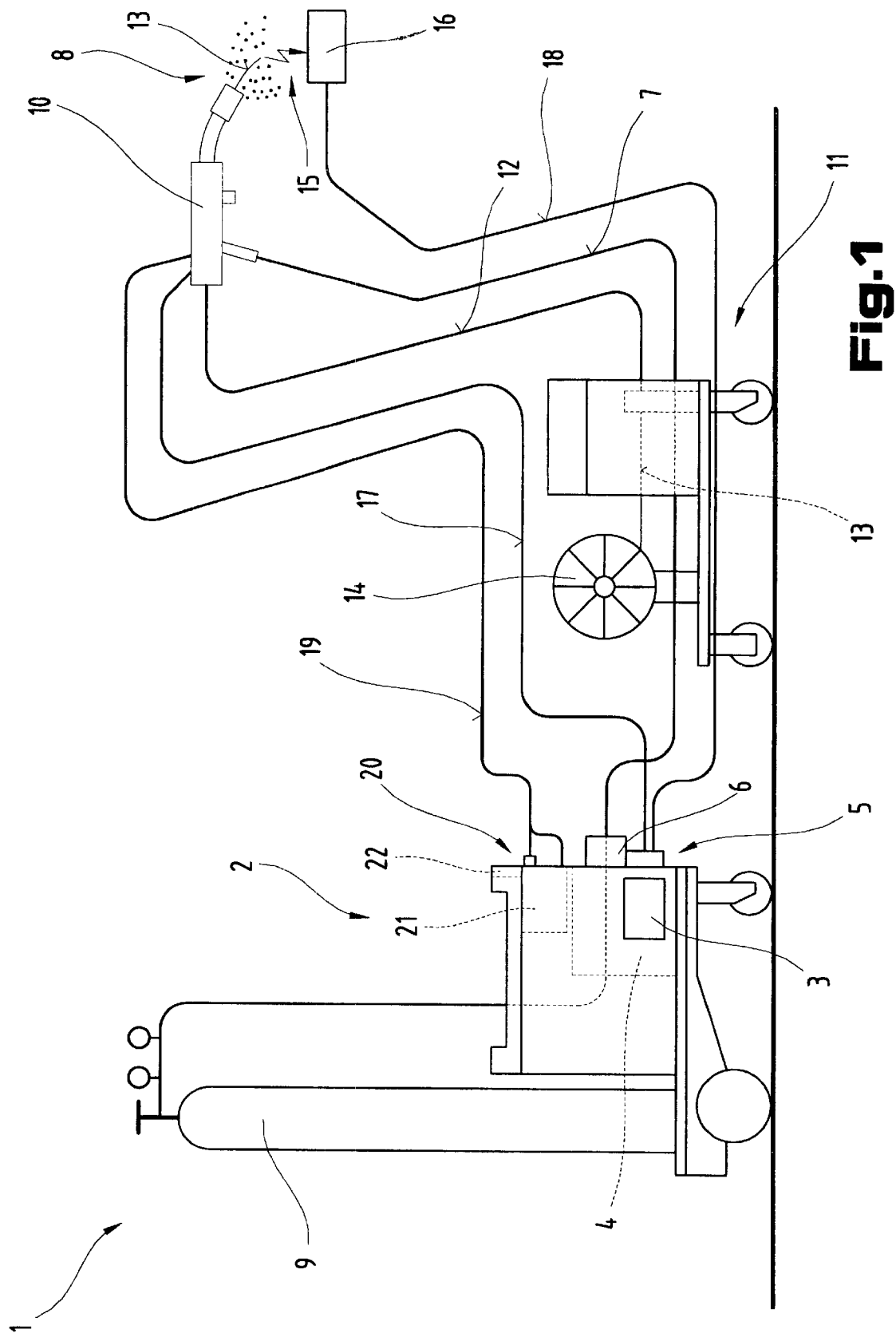
FIG. 1 is a simplified, schematic general diagram of a welding unit as proposed by the invention.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc,. relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 illustrates a welding unit 1 designed to perform the most varied range of welding processes, such as MIG-MAG welding or TIG or WIG welding, for example. The welding unit 1 comprises a current source 2 with a power component 3, a control device 4 and switching member 5 co-operating with the power component 3 and the control device 4. The switching member 5 or the control device 4 is connected to a control valve 6, disposed in a supply line 7 for a gas 8, in particular an inert gas such as nitrogen, helium or argon and similar, between a gas storage 9 and a welding torch 10.

A wire feed device 11 is also activated by the control device 4 so that a welding wire 13 is fed from a supply drum 14 out via a supply line 12 into the region of the welding torch 10. The current needed to produce an arc 15 between the welding wire 13 and a workpiece 16 is fed across a supply line 17, 18 from the power component 3 of the current source 2 to the welding torch 10 or the welding wire 13.

To provide cooling, the welding torch 10 is connected to a water container 21 via a coolant circuit 19 having an intermediately connected flow indicator 20, so that when the welding torch 10 is in operation the coolant circuit 19 can be activated by the control device 4 and the welding torch 10 or a gas nozzle of the welding torch 10 cooled. Clearly, it would also be possible to use an external coolant circuit 19 of a type known from the prior art.

The welding unit 1 also has an input and/or output device 22, by means of which the most varied range of welding parameters or operating modes can be set for the welding unit 1. The welding parameters set in the input and/or output device 22 are forwarded to the control device 4, from where they then activate the individual components of the welding unit 1 in accordance with the pre-set welding parameters. To this end, the welding unit 1 may also be connected to an external input and/or output device 22, such as a computer, a programmable logic controller or an operating element, etc.

Figure 2:
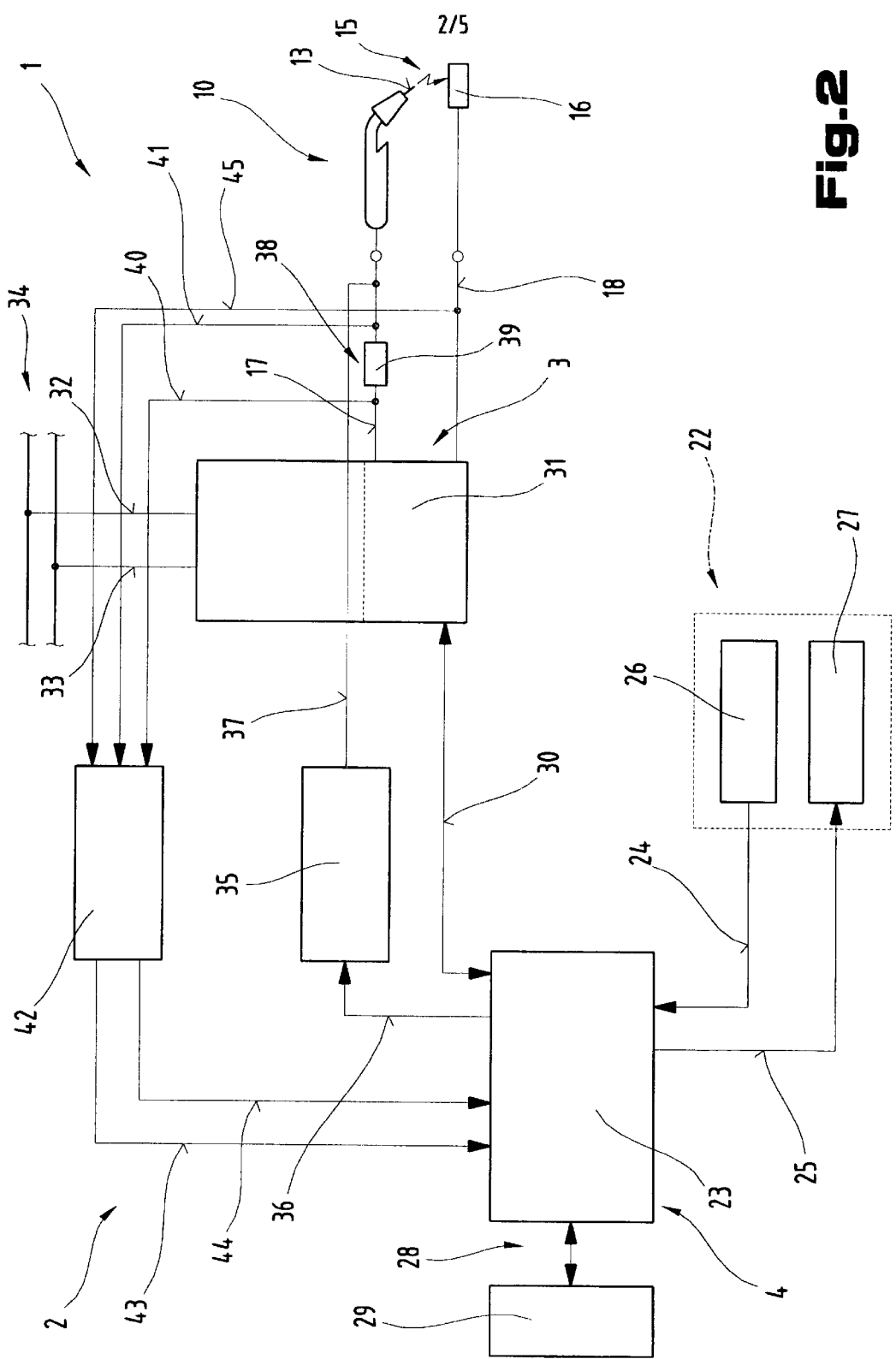
FIG. 2 is a block diagram of a control device of the welding unit, shown in a simplified, schematic form.
Figure 3:
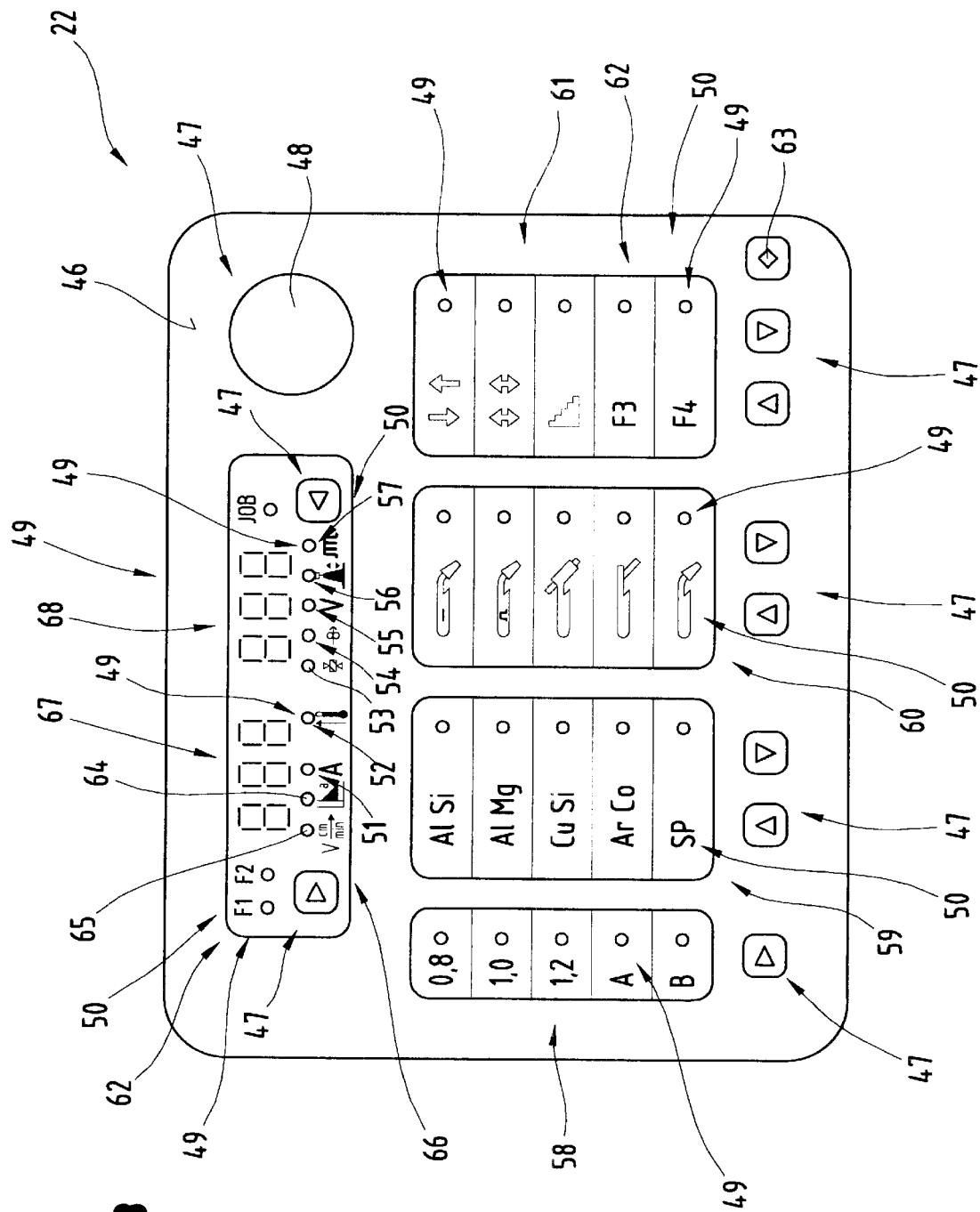
FIG. 3 is a simplified, schematic illustration of one face of the input and/or output device of the welding unit.

FIGS. 2 and 3 provide block diagrams of the welding unit 1, giving a more detailed illustration of the input and/or output device 22.

The control device 4 is preferably provided in the form of a microprocessor controller 23 or a conventional analogue or digital controller. The input and/or output device 22 is connected to an input of the control device 4, in particular the microprocessor controller 23, by several lines 24, 25, although only one of the respective lines 24, 25 is illustrated in order to retain clarity. However, it would also be possible for the input and/or output device 22 to be provided in the form of separate entities, in other words as an input device 26 and an output device 27. The input device 26 could also have a keyboard or other similar input features, for example a potentiometer, a touch screen or buttons, etc. The output device 27 may be provided as a digital display, a LED display, a LCD display, a digital display, a monitor or a touch screen, for example. Data is exchanged between the input and/or output device 22, in particular the input device 26 and the output device 27, and the control device 4 by means of the lines 24, 25. The control device 4 could also have a standardised interface so that data could be exchanged with the welding unit 1 or it could be configured from an external component, such as a robot for example.

A memory device 29 is connected to other inputs and/or outputs of the microprocessor controller 23 or the control device 4 via a bus system 28 consisting of data lines, for example, so that data or control programmes can be duly stored.

The control device 4, in particular the microprocessor controller 23, is connected to the power component 3 by at least one line 30. To speed up data exchanges between the power component 3 and the control device 4, the line 30 may be provided as an optical fibre. Clearly, it would also be possible to set up the connection between the control device 4 and the power component 3 using several electrical lines 30 or optical fibres. The power component 3 may be a clocked inverter current source 31, for example, or any other current source 2 known from the prior art. In order to be able to supply the power component 3 with energy, in particular with current and voltage, it is connected via supply lines 32, 33 to a voltage supply network 34. Clearly, any other type of energy source may be used instead of the voltage supply network 34, for example a battery, in order to supply the power component 3.

The purpose of the power component 3, in particular the inverter current source 31, is to convert the energy supplied by the public voltage supply network 34 into a corresponding welding energy and since this is done in a manner known from the prior art, no further description will be given of how the supplied energy is converted.

So that a welding process can be performed by means of the welding unit 1, the power component 3, in particular the inverter current source 31, is connected to the welding torch 10 and the workpiece 16 by means of the supply lines 17, 18.

To ignite the arc 15 between the welding wire 13 and the workpiece 16, the welding unit 1 may have a high-frequency generator 35, for example. The high-frequency generator 35 is connected to the control device 4 and the output of the power component 3 by lines 36, 37, in particular by means of the supply line 17. Clearly, it would also be possible for the arc 15 to be struck by any other method known from the prior art, e.g. contact ignition. In order to ignite the arc 15, a control signal is transferred from the control device 4 to the high-frequency generator 35, as a result of which a high-frequency signal is modulated to the welding energy so that, as welding wire 13 is fed to the workpiece 16, the arc 15 can be simply and automatically ignited at a specific distance between the welding wire 13 and the workpiece 16.

In order for the control device 4 to be able to monitor and control the welding process, a measuring device 38 is provided in the supply line 17 to the welding torch 10 or in the connecting line 18 to the workpiece 16. The measuring device 38 may be a shunt 39 of a type known from the prior art so that the flow of current across the supply line 17 can be detected by the measuring device 38. To this end, lines 40, 41 are connected at either end of the supply line 17, which are in turn connected to a converter 42 or directly to the control device 4. The purpose of the converter 42 is to convert the measurement values picked up by the measuring device 38, in particular the current and the voltage, into a digital signal and forward these via lines 43, 44 to the control device 4 or the microprocessor controller 23 so that a control process can be performed by the control device 4 on the basis of the detected data. In order to detect the voltage the welding torch 10 or between the welding wire 13 and the workpiece 16, another line 45 is provided between the converter 42 and the supply line 18.

FIG. 3 shows a face, in particular a front plate 46 of the input and/or output device 22. As explained with reference to FIG. 2, the input and/or output device 22 is connected to the control device 4 by means of several lines 24, 25 so that the input and/or output device 22 can be used to enter and display the individual welding parameters and different welding processes.

From the front plate 46, the user can use individual setting members 47 to select the most varied range of welding parameters and welding processes, which may be amended by the user using a main controller 48. So that the user can see the selected welding parameters, the input and/or output device 22, in particular the front plate 46, has individual display elements 49. In addition, the individual welding parameters and the various welding processes are represented by symbols 50 on the front plate 46.

The setting members 47 may be provided in the form of individual buttons or an incremental encoder for the main controller 48. To this end, as with the embodiment illustrated here, the setting members 47 may be provided as a membrane keypad or a potentiometer for the main controller 48. Clearly, any setting member 47 known from the prior art could be used.

The display elements 49 are provided as LEDs or LCD displays, for example. Again, it would be possible to use any other type of display elements 49 known from the prior art as a means of displaying the welding parameters or storing the values to be used. Instead of individual setting members 47 and display elements 49, it would also be possible to use a touch screen enabling the requisite welding parameters to be selected and displayed when the screen is touched.

A user now has the option of using the setting members 47 on the front plate 46 to select, display or edit a whole range of welding parameters, such as for example a welding current 51, a maximum temperature 52, a material thickness 53 for the workpiece 16, a wire feed rate 54, a welding voltage 55, an arc length 56 and a current rise 57. The user may also enter other welding parameters such as wire diameter 58, the gas mixture 59 as well as various welding processes 60 and additional functions 61. The welding unit 1 may also have a primary control device, such as a computer, programmable logic controller, an external operating unit, etc., for entering settings and displaying the settings. To this end, the primary controller will be connected via a standard interface to the welding unit 1 so that data can be transferred directly.

A detailed explanation will not be given of the operating procedure for selecting and displaying the individual welding parameters from the setting members 47 and display elements 49 since any method known from the prior art may be used to select or display parameters, in particular welding parameters. Suffice it to say that standard values or desired values for the individual welding parameters are stored in the memory device 29 so that when a corresponding welding parameter is selected the standard value or desired value is loaded from the memory device 29 and then displayed by activating the input and/or output device 22 of the control device 4 via the display elements 49 on the front plate 46. The user then has the option of amending the displayed standard value or desired value via the main controller 48 so that a welding process can be computed by the control device 4 using the settings entered by the user and then performed by the user.

The front plate 46 might also have a display element 49 in the form of a memory element 62, denoted by the symbol 50 "F1–F4". The display element 49 for the memory element 62 is provided in the form of a light emitter diode, for example, so that this display element 49 starts to light up when this symbol 50 is selected, enabling the user to see that this function was selected. Using a memory element 62 of this type, the user has the option of assigning additional welding parameters which are not listed on the front plate 46 to one of these memory elements 62 so that when the welding unit 1 is switched on again, he will be able to retrieve these welding parameters again without much effort, simply by selecting the corresponding memory element 62. The assigned data or assignment of the welding parameters is stored in the memory device 29. A memory key 63 is provided on the front plate 46 for this purpose.

The user also has the option of being able to select all welding parameters not indicated on the front plate 46 by operating the setting members 47 accordingly to select a memory element 62 so that the welding parameters not indicated on the front plate 46 can also be edited. The user may also assign individual process steps or process sequences to the memory elements 62, i.e. the user can assign a process sequence or method sequence, such as threading up the welding wire 13, to a memory element 62, which will give the user the possibility of activating this process sequence or method sequence via this memory element 62 at any time.

For the purposes of the invention, an additional welding parameter is entered in the welding unit 1, in particular the input and/or output device 22 or the control device 4. The additional welding parameter involves entering or setting specifications for a weld seam, in particular the surface area or cross section of a weld seam, namely the a-measurement 64, and a welding speed 65, which is displayed by a display element 66 in the form of a light emitter diode and as a symbol 50 on the front plate 46. The user therefore has the possibility of setting up the surface area or cross section for a welding method or a welding process in order to form all single- or multilayered weld seams.

The welding parameter or the welding specification of the a-measurement 64 is already known from the prior art but has never been incorporated in a welding process and, as things stand, the user has to obtain or calculate this welding parameter from welding plans or welding drawings and then enter values for the setting in the welding unit 1 from experience in order to produce a corresponding weld seam.

The a-measurement 64 is mainly used as a means of specifying measurements, in particular for the weld cross section of weld seams, in particular fillet welds, which account for the greater part of welding operations or welding processes. The dimensions of weld seams can be applied using different parameters or specifications and measurements. The weld thickness, the weld width or the side length of weld seams, in particular fillet welds, provide the user with information. The "seam thickness measurement a", the "seam width measurement b" or the "side measurement z" are given in the welding drawing. The a-measurement 64, the z-measurement or the b-measurement are used to set derived specifications for the length, surface area or volume. These can be used to form a surface area of a weld seam for a welding method or for a welding process for all single-layer or multi-layer types of weld seam. To give the user access to the different parameters, the user can select the welding parameters of the a-measurement 64 at the welding unit 1 and a setting member 47 can be operated to run through the different parameters, namely the a-measurement, the b-measurement and the z-measurement in a cycle or steps, to set up the dimensions of the weld seam. The formulas $$z=a*\sqrt{2}$$

$$b=\sqrt{2}*z^2$$

known from the prior art, which are stored in the memory device 29, can be used to compute individual unknown components or unknown specifications and then applied to the computation by the control device 4.

In the current state of the art, settings are entered in the welding unit 1 by the user himself, which means that the user will need a lot of experience and numerous training sessions in order to be able to set up a fillet weld, which is taken from the welding drawing for example, if the correct settings are to be entered in the welding unit 1. However, by entering predetermined parameters from the welding unit 1, the user will now have the possibility of being able to run an independent computation and set the individual welding parameters since all the formulas needed to run the computations for a weld seam are stored in the memory device 29 or control device 4.

To this end, the equation set out below may be used to compute the individual welding parameters, the following abbreviations being used for the individual welding parameters: weld seam cross section "A" in $mm^2$, welding speed "$v_{sp}$" in cm/min, cross section of the additional material "Az" in $mm^2$, wire feed "$v_{wire}$" m/min.

The equation used is therefore:

$$A * v_{sp} = Az * v_{wire}$$

By running conversions and derivations from the equation, the control device 4 can work out the welding speed 65 and the surface area of the weld seam or weld seam cross section, in particular the a-measurement 64:

weld seam cross section:

$$A = a^2$$

Cross section of the additional material $$Az = (d^2 * \pi)/4$$

a-measurement 64:

$$a = \sqrt{\frac{(d^2 * \pi * v_{wire} * 100)}{(4 * v_{sp})}}$$

welding speed 65:

$$v_{sp} = (d^2 * \pi \times v_{wire} * 100)/(4 * a^2).$$

The angle "w" of the two workpieces 16 to be welded together is also crucial in obtaining the requisite predetermined dimensions of the weld seam. If the user knows the angle of the work-pieces 16 to be welded together, he can use the formula known from the prior art $$A = \tan(w/2) * a^2$$

to work out the surface area of the weld seam relative to the a-measurement 64, abbreviated to "a".

Clearly, it would also be possible to apply formulas known from the prior art in order to work out other values for the welding parameters of weld seams such as the weld seam measurement b and the side measurement z. To this end, the side length, in other words the z-measurement abbreviated to "z" may be used or computed with the formula below.

$$A = [\sin(w \text{ of the workpieces} * z^2)]/2$$

For example, if a user wants to select or run a MIG/MAG welding process to produce a weld seam, in particular a fillet weld, the tool settings for welding units 1 known from the prior art are entered on the basis of the welder's or user's experience, i.e. the welder or user sets the wire feed rate, the welding voltage and the welding current on the basis of values which he knows from past experience will produce the estimated or determined surface area of the weld seam on the welding unit 1 and will then run the welding process at a corresponding welding speed also known from past experience. When a welding unit 1 is set up in this way and a welding process run at a welding speed estimated by the user, there is no guarantee that the welder or user will be able to produce a weld seam of the calculated surface area or cross section, which can lead to faulty weld seams. With faulty weld seams of this type, it may be that the weld seams will not be able to withstand stress on construction, causing the welded parts to break.

Because characteristic curves for welding can be programmed and stored in the memory device 29 of more modern welding current sources, the user or welder will have access to guide values prior to welding. To this end, the welder or user can take readings of, edit and transfer the individual welding parameters, such as the welding current, the welding voltage, guide values for the material thickness, the desired wire feed rate, from a selection in order to run a welding process corresponding to the stored characteristic curves. Whilst this made it easier for the user to set up or adjust predetermined welding parameters, specifications relating to the anticipated seam thicknesses or the surface area or cross section of the weld seam still had to be taken from the welding plan or welding instructions or the welding speed was left to the personal experience of the welder or user.

For a welder or user to be able to set up a more or less predetermined weld seam, in particular a fillet weld, he had to run several test welds before going ahead with the actual welding process in order to find the correct setting for the unit or the correct welding speed, incurring a significant loss of time and material. Even then, there was always the risk of faulty welding in the form of cold spots or due to too much heat because a welding parameter was incorrectly selected.

The welder or user now has the possibility of entering the different parameters, e.g. the a-measurement 64, from the input and/or output device 22, whereupon the control device 4 will use the formulas known from the prior art to compute the missing components or welding parameters, displaying them to the user or welder on the input and/or output device 22. The user may activate the two display elements 66 and the welding parameters for the a-measurement 64 and welding speed 65 for this purpose and make the relevant entries so that a computation can be run using the known formulas. The computing principle may be run on the basis of different welding parameters, such as the seam thickness measurement a, the seam width measurement b, the side measurement z, i.e. by selecting the display element 66, in particular the a-measurement 64, and the welder can enter at least one parameter or value with one of the other different welding parameters to prompt the control device 4 to run the computation for the welding process. This being the case, if a specification is missing or a parameter is missing, the control device 4 will calculate the missing specification or parameter by converting the formulas so that the welder will then be able to take a reading of this value by activating the welding parameter of the a-measurement 64.

To enable the welder or user to run a corresponding welding process with the setting of the a-measurement 64, corresponding desired values may be stored in the memory device 29, i.e. various desired values are memorised for the different parameters of a weld seam surface area or a weld seam cross section for a weld seam, in particular a fillet weld, enabling the user to select a corresponding parameter, in particular the surface area of the a-measurement 64, so that these desired values will be loaded from the memory device 29 into the main memory of the control device 4 and displayed on the input and/or output device 22. The user then has the option of editing the corresponding desired values of the a-measurement 64 via the main controller 48. If a user runs a change on a desired value, the control device 4 will run a new computation of the a-measurement 64, in particular the individual parameters such as the welding current, the wire feed rate, the welding speed 65 for a weld seam, for example, and the individual values will be displayed on the input and/or output device 22 in stages.

Since the welding parameter for the welding speed 65 is crucial to any welding process, in particular the setting for the a-measurement 64, the welding parameter for the welding speed 65 may be displayed and edited at the input and/or output device 22 or a primary control device such as a computer or a programmable logic controller, etc., for example, so that the welding speed 65 for the welding torch 10 will be monitored by the control device 4 or a speed monitoring device, i.e. during a welding process, the welding speed 65 will be detected by the welding unit 1, in particular by the control device 4, so that the welding speed 65 can be adjusted and hence a pre-set weld seam, in particular a fillet weld, produced by the user. An embodiment of this type for monitoring the welding speed 65 of the welding torch 10 will be explained in more detail with reference to FIG. 7.

Clearly, it would also be possible when using the welding unit 1, in particular the welding torch 10, to enter the setting for the welding speed 65 for a welding robot directly from an interface of the welding unit 1, in particular from the control device 4, on the welding robot so that data can be exchanged across the interface during an actual welding process in order to adjust the welding speed 65 between the welding robot and the control device 4. To this end, a signal or corresponding data set is forwarded by the control device 4 to the welding robot via the interface for a high welding speed 65 or a low welding speed 65, as a result of which the welding robot will increase the welding speed 65 depending on the predetermined settings of the welding unit 1. Clearly, it would also be possible to pre-set the welding speed 65 of the welding robot in the welding unit 1 or the control unit 4 via the interface so that if the welding speed 65 changes the control device 4 will adjust the other welding parameters such as the wire feed rate etc., to conform to the new welding speed 65. At the same time, the user has the option of using a special function in the form of a welding parameter to enter a setting at the welding unit 1 or at the input and/or output device 22 for the data exchange with an external component. This being the case, the user can determine whether individual parameters, e.g. the welding speed 65, is pre-set from the external component or the control device 4, which means that a direct exchange of data can be effected between the welding robot and the control device 4, for example.

To this end, by selecting the welding speed 65 as the welding parameter by operating a setting member 47, the user can access this special function or this welding parameter and therefore enter a corresponding setting for a data exchange with or data transfer to an external device or system, such as a welding robot. The user may also enter other settings or parameters needed for the data transfer such as baud rate, etc.

Once the user has selected this special function, it is then possible to call up firstly another special function from the control device 4, which is displayed on the input and/or output device 22, by means of which the user can enter a setting to determine whether a welding process will be performed with a manual welding torch or a robotic welding torch. This is an advantage because different desired values have to be stored in the memory device 29 for the two different types of welding and the control device 4 can therefore load the desired values for the selected type of welding into the main memory or can access the requisite desired values.

Making a distinction between the welding types in terms of a manual, semi-automated or automated welding process, such as a manual welding process or a robot-controlled welding process, means that the control device 4 has to perform and run different tasks in order to compute the individual welding parameters and to monitor the welding parameters, i.e. in the case of a robot-controlled welding process, the welding speed 65 can be more accurately pre-set or regulated whereas with a manual welding process only guide values are generally pre-set for the welding speed 65 because the user or welder is not usually in a position to maintain the pre-set welding speed 65 exactly and an adjustment is continuously applied to the other welding parameters by the control device 4. Another difference between the two types of welding resides in the fact that with robotic welding the welding speed 65 can be significantly increased, which means that other threshold values can be set for running a welding process.

Making a distinction between the two welding types means that the control device 4 can apply user-defined data and stored settings for computing the welding process when a manual welding process is selected. For example, the user enters his usual welding speed 65 for a test weld and this is stored in the memory device 29 by entering it via the input and/or output device 22 so that the control device 4 will adjust the other welding parameters to this welding speed 65 as part of the computation and the user has no need to change the properties he usually uses. This approach more or less ensures that the user will be able to produce a pre-set weld seam accordingly.

In order to monitor the welding speed 65 of the welding torch 10 when using a welding robot or for manual welding, any method known from the prior art may be used to monitor the welding speed 65 of a welding torch. These methods or devices and systems do not have to be integrated in the welding unit 1 and it is possible for the devices or systems to be connected to the welding unit 1, in particular the control device 4, via an interface. Clearly, it would also be possible for these systems and device for measuring the welding speed 65 of the welding torch 10 to be integrated in the welding unit 1 and run by means of the control device 4 using an appropriate software control system.

With a predetermined seam thickness or side length as taken from the welding plans or from a set of welding instructions, the user has the option of using the input and/or output device 22 to set the individual parameters needed to calculate the a-measurement 64. To this end, the user or welder selects the display member 66 for the a-measurement 64, after which the user can enter one of the parameters, such as the seam thickness measurement a, the seam width measurement b and the side measurement z.

A reading of the desired values duly stored in the memory device 29 is taken by the control device 4 and then displayed on the input and/or output device 22 but can be amended by the user from the main controller 48. To skip to the next parameter, the user can operate a setting member 47 to move on to the next parameter. In addition, the other settings used to compute the a-measurement 64, such as the additional material, the wire type, the diameter of the additional material, the gas used, etc., can then be incorporated in the computation by the control device 4.

Once the user has set all the parameters in the welding unit 1, in particular the input and/or output device 22, the control device 4 runs the computation of the individual parameters that were not entered or not known by the user and the user can then display and take a reading of the calculated values from the input and/or output device 22 one after the other.

If necessary, the user or welder can correct the arc length and/or the welding speed 65 as well as the arc dynamics, i.e. by scrolling through the display, the user has the option, by operating the setting member, of interrupting the staggered display of the individual welding parameters so that the user can make any corrections which might be needed from the main controller 48. If the user then operates a setting member 47 again, the display will move on to the next welding parameter.

To enter the setting for the a-measurement 64, the display element 66 may also be selected and, once the individual parameters have been entered, the user can select the display element 66 for the welding speed 65 so that the calculated value will be displayed on the input and/or output device 22. The welding speed 65 can be automatically monitored by the welding unit 1, in particular the control device 4, during a welding process, as described with reference to FIG. 7. Clearly, the welding speed could also be monitored by a primary and/or subordinate external control device such as a programmable logical controller, for example.

By selecting the display member 66, the user can also look up the individually calculated desired values from the input and/or output device 22, for example, so that by operating a setting member 47 the user can then change the stored desired value. Clearly, different desired values for the different welding process may also be stored in the memory device 29, i.e. the desired values stored for a robotic welding process may be different from those of a manual welding process and when the parameters for the manual welding process are selected those parameters stored specifically for manual welding will be displayed.

Storing different desired values for a manual welding process and a robot welding process makes it easier to monitor the welding process, particularly as regards the welding speed 65 because the control and exchange of data with the welding robot can be operated directly, making it possible to control the process accurately, i.e. by connecting the welding unit 1, in particular the control device 4, to the control device of the welding robot via an interface, a direct input to the control process of the welding robot can be set up, making it possible to control or run a process to produce a fillet weld. Clearly, it would also be possible for the welding robot to access the control system of the welding unit 1.

The advantage of incorporating the a-measurement 64 in the welding programme of a welding unit 1 or a control device 4 is that when setting up the welding unit 1 to perform a weld seam, in particular a fillet weld, the user or welder is assisted by the control device 4, so that entries needed for welding will not be left out. By incorporating the a-measurement 64, it is also possible for untrained personnel to produce a predetermined fillet weld corresponding to the welding drawings without having to carry out laborious test welds, thereby avoiding faulty welding or preventing a bead from being deposited over too small a surface area.

By keeping pre-set values in memory, it is also possible to make an adjustment to the personal preferences of a user as is the case with the welding parameters of the welding speed 65 for example, so that when performing the welding process, the user can operate at a welding speed 65 to which he has grown accustomed over the years. To this end, by setting the a-measurement 64, the other parameters for a predetermined fillet weld can be adapted to the set welding speed 65 which the user has become used to. Clearly, it would also be possible for the user to run a test weld so that the accustomed speed 65 of the user can be determined and then stored in the memory device 29 and the personal welding speed 65 of the user will be applied to computing a predetermined fillet weld when the other parameters for the a-measurement 64 are selected, thereby adapting and determining the different settings such as the wire feed rate, the arc length, etc. Several personal data sets for one or more users may also be stored so that when a corresponding welding speed 65 is selected the control device 4 will adapt to a whole range of users.

Using the welding parameter of the a-measurement 64 also means that it is easy to find parameters during automated welding, particularly welding with robots, because the user does not have to run test welds with the welding robot since the individual welding parameters are selected and automatically computed. The big advantage of this is that the welding robot can be adapted to the computed welding speed 65 without having to monitor the welding speed 65, particularly of the welding torch 10.

If the user is running a welding process with the newly introduced special functions, in particular the newly entered welding parameter of the a-measurement 64, the individual welding parameters such as the welding current, the wire feed rate, the welding voltage, the welding speed 65, etc., are initially computed by the control device 4 so that the welding unit 1 can be automatically and independently set up by pre-setting the welding parameters from the control device 4. However, in order to compute the welding process, the user must or can pre-set some welding parameters such as the welding current, the surface area or cross section of the weld seam, for example, in particular the a-measurement 64. If, however, the user does not set any welding parameters or sets too few, the control device 4 will use the desired values stored in the memory device 29 for the computation, i.e. the different desired values for the welding parameters needed for different welding seam cross sections, in other words the surface area of the weld seam, namely the a-measurement 64, and used to produce a seam of this type are stored in the memory device 29. These desired values may be pre-set by the manufacturer of the welding unit 1 or alternatively the desired values could be set by the user when the welding unit 1 is used for the first time.

The user therefore has the possibility of being able to run a welding process simply by selecting a weld seam cross section, in particular a desired value of the a-measurement 64, without requiring any specialist knowledge of how to set up the welding unit 1 to produce a predetermined weld seam. However, if the user does enter some welding parameters, such as the welding current, the welding speed 65, etc., for example, a new computation will be run by the control device 4 for the welding process and the other welding parameters that were not pre-set will be adapted to them. This type of approach means that the user can run a welding process and in doing so incorporate his personal welding preferences or welding experience in the computation and in the welding process.

However, if a situation arises in which one or more welding parameters can no longer be run by the welding unit 1, i.e. these welding parameters lie outside predetermined threshold values, they will be displayed by the control device 4 at the input and/or output device 22. Accordingly, the control device 4 may issue a warning signal and/or the display of welding parameters will start to flash so that the user is made aware of the situation. The user can then change or re-enter some of the welding parameters to run a new computation of the individual welding parameters. Clearly, it would also be possible for the user to amend these pre-set threshold values so that it will be possible to run a welding process with the computed welding parameters.

Since the user has the option of differentiating between a manual, semi-automated or automated welding process, in particular a manual welding process and robot welding, the predetermined threshold values for the two different types of welding are also defined on a different basis and it may be that a higher speed setting 65 can be operated for robot welding than is the case with a manual welding process, for example.

There are several possible ways of storing the desired values in the memory device 29. For example, for every weld seam cross section, in particular for the most frequently used weld seam cross sections, the individual additional welding parameters needed for this weld seam cross section can be stored although if a memory system of this type is to be used for the individual desired values a high memory capacity will be required.

For the purposes of the invention, it is also proposed that the desired values for at least one welding parameter of a welding method representing minimum and maximum values be stored in the memory device 29 in the form of a minimum and maximum curve, i.e. all welding parameters for a minimum and a maximum weld seam cross section are stored in the memory device 29, these desired values simultaneously serving as the threshold values for the possible weld settings. This means that the desired values for a welding method are provided by a plurality of minimum and maximum values or a minimum and maximum curve. However, so that weld seams with a cross section somewhere between these two curves can be performed, the control device 4 applies an interpolation calculation method for weld seam cross sections lying in between, i.e. the values or welding parameters in between these two curves are computed on the basis of the predetermined minimum and maximum curve.

This method of storing a minimum and a maximum curve for a specific welding method or welding type or welding parameters, in particular the individual weld seam parameters, can therefore be defined in such a way that for one or more welding methods or welding types or welding parameters (weld seam parameters), it is possible to store for the weld seam setting, such as the weld seam cross section or for fast or slow welding, etc., a minimum curve and a maximum curve respectively having the most varied range of welding parameters, such as for example the welding current, the pulse current, the welding voltage 55, the pulse frequency, the wire feed rate 54, the welding speed 65, etc., paired with this welding method or this welding type or welding parameters (weld seam parameters). This being the case, the individual minimum and maximum curves are made up of several individual desired values for the associated welding parameters so that the individual minimum curves and the individual maximum curves can be interleaved with one another.

As a result of this computing method, in particular the interpolation calculation, the values or desired values lying in between the minimum curve and the maximum can then be determined when setting up the welding method (weld seam parameters). This being the case, it is also possible to store other curves falling between the minimum curve and the maximum curve so that a more accurate computation between the individual curves can be run, adapted exactly to the welding process.

Using this type of storage in the form of several linked curves also means that so-called intermediate curves or diagrams can be formed by several desired values within the individual curves, because, for example, a curve comprising several desired values, e.g. four desired values for every welding parameter, is generated and the other welding parameters within a curve and simultaneously a set welding method or welding type or welding parameter (weld seam parameter) lying between the minimum curve and maximum curve is computed by means of the interpolation calculation.

This approach to storing and determining the individual desired values may also be compared or set up with a table function, in which case a table, in particular a minimum and maximum table, along with one or several other tables can be memorised or stored with the other paired welding parameters and their desired values, enabling a computation of desired values lying somewhere in between to be run by means of the individual tables using the interpolation calculation.

By storing several curves or several tables, in particular by computing the desired values, a three-dimensional characteristic curve is produced for the welding process, since the stored curves are used as the basis and the other desired values are computed in one or more computation sequences.

In order to be able to use a method of this type, the interpolation calculation has to be such that the user is required to pre-set at least two welding parameters (weld seam parameters). Clearly, it would also be possible to set several different welding parameters (weld seam parameters). For example, when configuring the weld seam cross section, the user can pre-set a desired value between the individual minimum and maximum curves for the weld seam cross section and a current level (output) so that the interpolation calculation can determine the other desired values for the other paired welding parameters, thereby generating other curves for the individual welding parameters lying somewhere between the maximum and minimum curves, by means of which the welding process can then be run.

Clearly, it would also be possible to retrieve or set a welding parameter below or above the minimum and maximum values or curves via the control device 4 using a computing method, in particular an interpolation calculation. Any limit would be set by the output thresholds of the welding unit 1.

For this, the user need only set a corresponding weld seam cross section, in other words the a-measurement 64, from the input and/or output device 22 and the other welding parameters will then be determined as part of the computation by means of the interpolation calculation method, so that the welding unit 1 can be run on the basis of the welding parameters computed or determined by the control device 4.

The weld seam cross section or the dimension specifications for a weld seam can be set up by the user by retrieving or selecting the a-measurement 64 or the other possible additional parameters, such as the seam width measurement "b" or the side measurement "z". So that the user will know which of the additional functions or welding parameters have to be set by him, two 7-segment displays 67 or 68 may be provided or activated, as illustrated on the input and/or output device 22, a brief message being displayed on one 7-segment display 67 or 68, e.g. a-M, b-M, or z-M, whilst the associated desired or actual value would appear on the other 7-segment display 67 or 68. Depending on the design of the welding unit 1, the user can now change the displayed value via the main controller or, for example by means of a setting member 47 or a keypad. To this end, it may be that the user only has to enter one additional parameter, in particular a welding parameter, after which an independent computation of the other welding parameters will be run. A three-dimensional characteristic curve is obtained by using a computation method of this type.

The advantage of this is a considerable saving in terms of memory space, which means that only a small amount of space is needed to store a large number of different minimum and maximum curves for a large range of welding types and welding methods.

If using a computation method of this type, the user will also be able to pre-set a few welding parameters for the computation, in particular for the interpolation computation method, so that these welding parameters will be preserved and the remaining welding parameters adapted to the welding parameters that were set. The user could also pre-set all the welding parameters, in which case the weld seam cross section, namely the a-measurement 64, and the welding speed 65 would be determined by the control device 4.

By including the welding parameters, in particular the additional function, in the computation of the weld seam cross section, it will also be possible for the control device 4 to adapt the other welding parameters during a welding process, such as the wire feed rate, the welding voltage, the welding current, the welding speed, i.e. when changing a welding parameter, for example the welding speed 65 with a predetermined a-measurement 64, the other welding parameters such as the wire feed speed can be amended during the welding process, which will in turn ensure that a corresponding weld seam is produced. To this end, the individual welding parameters may be adjusted by regulating the desired values or the actual values, i.e. if an adjustment is made on the basis of the pre-set desired values, the other welding parameters will also be amended if a new desired value is applied by the control device 4 during the welding process, so that when the actual values of the welding unit 1 are adjusted the individual welding parameters will be continuously adjusted to the different actual values.

By using an interpolation computation method, in other words by storing a minimum and a maximum curve for a specific type of welding, it will be possible to incorporate additional parameters in the computation because of the small amount of memory space required. This being the case, it will be possible to include factors such as the material of the workpiece 16, the alloy of the workpiece 16, the gas mixture, etc,. in computing the individual welding parameters.

Because of the option of being able to compute the individual welding parameters for a predetermined weld seam, in particular a weld seam cross section, it is also possible to provide an expert data bank in the welding unit 1, in particular in the memory device 29, so that the user can access these from the input and/or output device 22 or from an external component such as a computer, which will enable the user to read off this data and search for comparative solutions appropriate to the problem, after which a solution can be applied to the control device 4 in order to set the unit so that the welding unit 1 can be set automatically. Clearly, the user could also expand this expert data bank using his own specialist knowledge, which will enable him to access this data at any time whenever a problem arises.

The user can also compute energy needed on the line from the welding unit 1 and the determined values applied to calculating the a-measurement 64. For this purpose, when the welding parameter of the a-measurement 64 is selected, the parameters needed to compute the line energy are retrieved by the welding unit 1 or the previously set parameters are used. The user can set the individual parameters using the input and/or output device 22 or the existing parameter settings may be used for the computation.

The control device 4 uses the formula known from the prior art to calculate the line energy $$E = I*U*60/v$$

the line section energy "E" being made up of the welding current "I" times the arc voltage "U" times the conversion factor in minutes "60" divided by the welding speed "v".

From the welding unit 1, it is also possible to run a computation of the heat applied. Heat during welding is defined as being the thermal energy, in particular heat, applied per unit length of a bead or a weld seam during the welding process. In this case, the line energy "E" computed by the control device 4 is multiplied by the thermal efficiency "n" of the respective heating method set or being run in order to obtain the heat applied "WE", producing the formula $$WE = E*n.$$

To this end, the user can select a corresponding welding process from the input and/or output device 22 so that a value for the efficiency "n" stored in the memory device 29 can be incorporated in the computation by the control device 4. The relative thermal efficiency "n" is the ratio of the efficiency of the welding method in question to that of submerged arc welding, for which purpose a corresponding table setting out the different methods can be stored in the memory device 29.

The multiplication factors for the respective welding methods may be as follows, for example:

| | |
|---|---|
| Submerged arc welding | n = 1 |
| Manual arc welding with basic enclosed electrode | n = 0.9 |
| Manual arc welding with rutile enclosed electrode | n = 0.8 |
| Metal active gas welding | n = 0.85 |
| Metal inert gas welding | n = 0.75 |
| Tungsten inert gas welding | n = 0.65 |

Clearly, the user could also amend the above-mentioned values from the input and/or output device 22.

By computing the line energy and the heat applied, the user will be able to enter an exact setting in the welding unit 1 for a predetermined weld seam, thereby preventing faulty weld seams.

With the method of setting up or entering settings for a weld seam to generate a welding process described above, it is also possible for the fixed welding parameters such as the wire feed rate to be defined as predetermined values so that the other welding parameters such as the welding speed 65, the welding current, etc., can be calculated on the basis of these welding parameters.

Clearly, because the individual welding parameters are monitored, it would also be possible for the values detected or measured to be stored in the memory device 29 so that the individual values or data can be evaluated after the welding process is finished.

This being the case, by pre-setting the welding speed 65 and/or the wire feed rate 54 from the control device 4, the consumption of additional material, in particular the welding wire 13 or the flux supply "P" in kg/h can be calculated. The flux supply can be determined by the control device on the basis of the specific weight of the additional material, in particular the welding wire 13. Clearly, any formula known from the prior art or any method may be used to compute the flux supply or the additional material consumed. For example, the following abbreviations may be used for the formula below:

Flux supply: "P in kg/h"

Diameter of additional material: "d"

Cross section of the additional material, in particular the welding wire 13:

$$"A_z = (d^2 * \pi)/4"$$

Wire feed rate: "$v_{wire}$"

Density of the additional material "p"

and a factor to convert to "kg/h" of 1000 or 60.

$$P = (A_z * v_{wire} * P * 60)/1000$$

By using this type of method to determine the flux supply or consumption of additional material, the user can ascertain the quantity of welding wire 13 consumed after a welding process and will be able to estimate how much welding wire 13 is left in the supply drum 14 for a subsequent welding process. Clearly, it would also be possible to make this type of calculation by pre-setting the size of the supply drum 14 in the control device 4.

It would also be possible to perform other evaluation methods by means of the control device 4.

Figure 4:
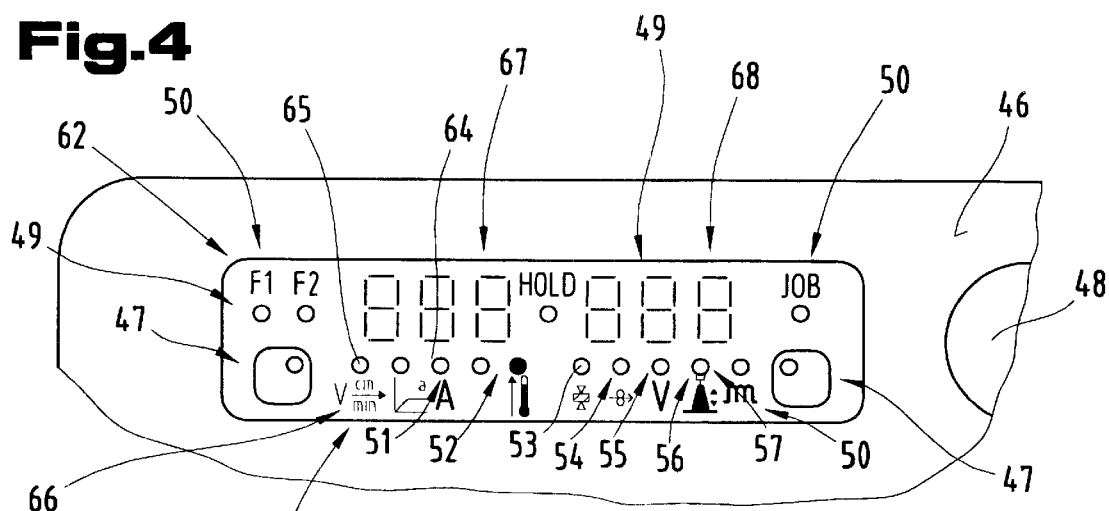
FIG. 4 is a simplified, schematic illustration of another embodiment of the face of the input and/or output device of the welding unit.
Figure 5:
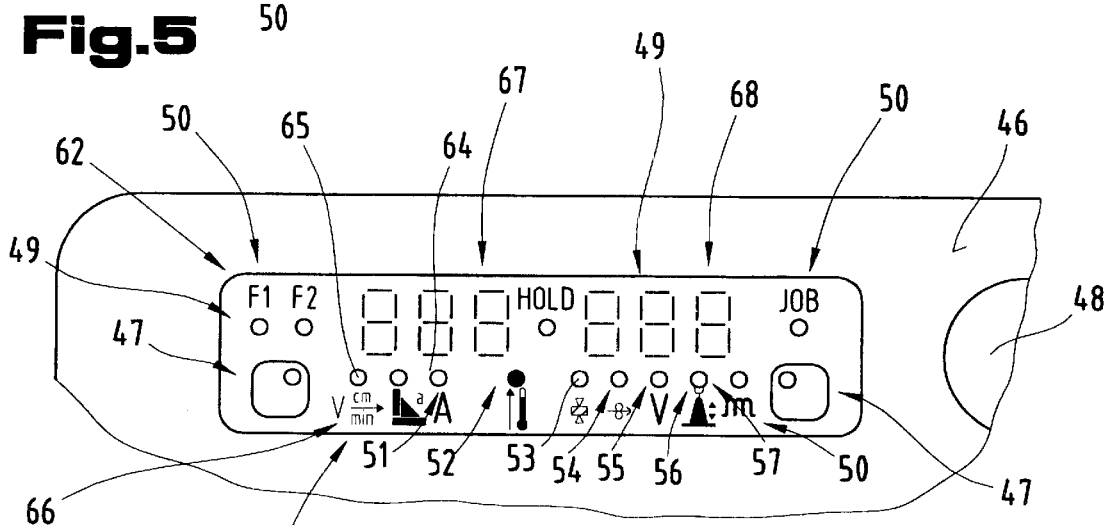
FIG. 5 is a simplified, schematic illustration of another embodiment of the face of the input and/or output device of the welding unit.
Figure 6:
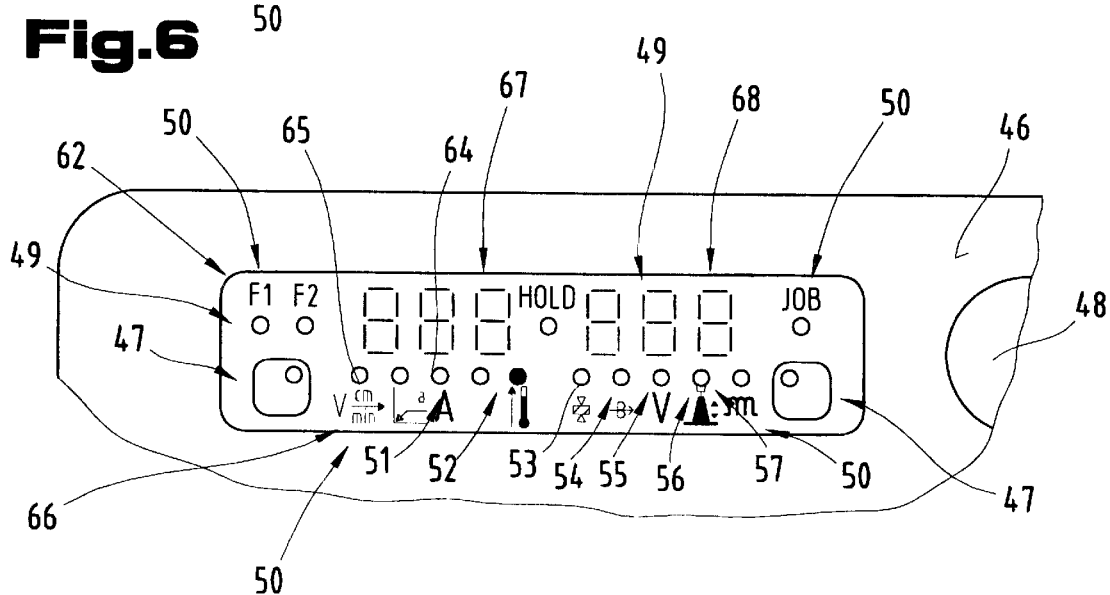
FIG. 6 is a simplified, schematic illustration of another embodiment of the face of the input and/or output device of the welding unit.

FIGS. 4 to 6 illustrate a partial region of one embodiment of the input and/or output device 22 for setting the a-measurement 64 and the welding speed 65. The display elements 66 here are represented by a range of symbols 50.

The function used to adjust or set the a-measurement 64 by means of the display element 66 corresponds to the description of the other drawings given above. The symbolic presentation corresponds to the standardised symbols 50 for depicting fillet welds so that a user operating a welding unit 1 of this type will immediately be able to see that the a-measurement 64 and the welding speed 65 can be set by means of these symbols 50, in particular the display elements 66, at any time.

FIG. 7 illustrates a method of determining the welding speed of the welding torch 10. In the welding method illustrated here, as with the drawings described above, a fillet weld 69 in the form of a bead 70, in particular a weld se am, is produced using the welding unit 1 proposed by the invention and an appropriate welding method.

In order to produce a fillet weld 69 in accordance with specifications taken from a weld drawing between two workpieces 16 and 71 which are to be welded to one another at an angle of 90E, the user must programme the welding unit 1 using the settings from the weld drawing, as explained with reference to the drawings described above.

In order to monitor the welding speed, the welding torch 10 may be guided by a user manually along the two edges of the workpieces 16 and 71, as in the embodiment illustrated here. In order to determine the welding speed, a speed measuring device is provided in the welding unit 1.

This speed measuring device in the welding unit 1, in particular in the control device 4, is provided in the form of software and hardware so that when a welding process is initiated by the control device 4 the welding speed of the welding torch 10 can be automatically or independently detected. The user may deactivate monitoring of the welding speed and hence perform a welding operation on the basis of values learned from experience without intervention by the speed measuring system.

In order to be able to monitor the welding speed and a welding process, as known from the prior art, the two workpieces 16, 71 must be connected to the welding unit 1 by means of at least one contact 72, so that a current flow or current circuit can be established from the welding torch 10 across the contact 72 to the inverter current source 31, i.e. a circuit is set up across the workpieces 16, 71 when energy is applied to the welding torch 10. The current circuit is created by striking the arc 15 between the welding wire 13 and the workpiece 16 or 71 and the welding wire 13 is fused because of the arc 15, thereby forming the bead 70.

In order for the welding speed of the welding torch 10 to be monitored, the workpiece 16 or 71 can be placed in contact with additional measurement contacts 73, 74. These measurement contacts 73, 74 are potential-free contacts, i.e. the main current flowing across the workpiece 16, 71 does not flow across the two measurement contacts 73, 74 but is fed across the contact 72 to the welding unit 1. Another measurement contact 75 or measurement point is also provided in the welding torch 10. The individual measurement contacts 73 to 75 are connected to the control device 4 by lines so that the control device 4 is able to determine the welding speed of the welding torch 10 by means of the measurement contacts 73 to 75.

However, to enable the control device 4 to make the user or welder aware of whether the welding speed is correct, in other words whether the welding torch 10 is being displaced at the correct speed, the welding torch 10 may additionally have at least one display element 76, but preferably three display elements 76 to 78. These display elements 76 to 78 are preferably provided in the form of light emitter diodes, it being possible for each display element 76 to 78 to be provided in different colours, in particular red, green and yellow. The individual display elements 76 to 78 are in turn operated and activated by the control device 4 and as the display element 76 to 78 starts to light up accordingly, the user will be able to tell whether the welding speed conforms to or is at variance with the welding speed programmed via the input and/or output device 22.

To this end, each display element 76 to 78 will display a specific status of welding speed, i.e. if the display element 76 is illuminated, for example, the user will be aware that he is moving the welding torch 10 forwards quickly, in other words the welding speed is too high, and the user can adjust accordingly by moving the welding torch 10 more slowly, whilst the other display elements 77, 78 may be used to indicate states in which the welding speed is correct or too slow.

The system used to detect the welding speed may be provided in the form of a resistance bridge, i.e. using the three measuring points or measurement contacts 73 to 75, the control device 4 in the form of a voltage divider will be able to trace the welding speed back to changes in the individual voltages. To this end, when the welding unit 1 is switched on, in other words before the start of the welding process, a measurement is taken of the actual value between the two measurement contacts 73 to 74 located on the workpiece 16 or 71, thereby enabling the total voltage 79 applied by the control device 4 to be determined. Once the total voltage 79 has been determined, the control device 4 can now be calibrated, i.e. the part voltages 80, 81 due to the current circuit established across the welding torch 10 to the individual measurement contacts 73, 74 co-operating with the workpiece 16 or 71 can be determined from the total voltage 79, i.e. the welding speed is computed on the basis of a resistance bridge formed across the workpiece 16 or 71. By creating the resistance bridge, the individual part voltages 80, 81 to the measurement contacts 73, 74 can be determined by the control device 4 from the measurement contact 75 on the welding torch 10.

Due to the motion of the welding torch 10 from one measurement contact 74 to the other measurement contact 73, a change will occur in the individual part voltages 80, 81 as the welding torch 10 is moved farther way from or closer to the measurement contacts 73, 74, i.e. depending on the distance of the welding torch 10, in particular the cross-over of the arc 15 to the workpiece 16 or 71, a change in resistance occurs relative to the measurement contacts 73, 74 thereby causing a change in the part voltages 80, 81. The control device 4 uses this change in the part voltages 80, 81 relative to a pre-settable time to determine the speed at which the welding torch 10 is being moved forward, in other words the welding speed, so that the user is made aware of the status of the welding speed as the display elements 76 to 78 are activated, enabling the user to make adjustments accordingly.

The welding speed is determined in such a way that once the control device 4 has been calibrated to the total voltage 79, the welding process can be started by the user so that the arc 15 is struck between the workpiece 16 or 71 and the welding torch 10, in particular the welding wire 13 and, because current flows from the welding torch 10 across the workpiece 16 to the contact 72, a form of resistance bridge is produced on the workpiece 16, even though the individual measurement contacts 73 to 75 are potential-free. As a result of this type of resistance bridge, the different distances of the welding torch 10, in particular the arc 15, from the measurement contacts 73, 74 result in different part voltages 80 to 81, the control device 4 detecting different part voltages 80 to 81 from the continuous measurements taken between the individual measurement contacts 73 to 75, as indicated by the broken lines and the dotted-dashed lines schematically illustrating the part voltages 80, 81.

As may be seen, the part voltage 80, for example, increases if the welding torch 10 is moved in the direction of arrow 82—relative to the measurement contact 74 whilst the part voltage 81 is reduced relative to the measurement contact 73. By detecting the change in the individual part voltages 80, 81 relative to a pre-settable time, the control device 4 will now be able to track back to or compute the welding speed. However, in order to determine the welding speed, the individual measurement contacts 73, 74 must be positioned at the opposite ends of the workpiece 16 or 71 for a welding process.

Clearly, other measurement contacts or measuring points may also be provided on the workpiece 16, in particular on the side edges of the workpiece 16, as a result of which it will be possible to take a speed measurement in a lateral direction by forming another region of resistance. In order to take a horizontal speed measurement, the individual measurement contacts must be placed one above the other.

By automatically determining the welding speed of the welding torch 10 during manual welding, it will then be possible to perform an accurate welding process corresponding to the settings of the a-measurement 64 for weld seams, in particular for fillet welds. Clearly, the speed measurement of the welding torch 10 may also be used for other welding methods.

This method of determining the welding speed 65 can be used on any workpiece 16, 71 made from different materials since only at least two additional measurement contacts 73, 74 have to be provided on the workpiece 16, 71 in order to detect the part voltages 80, 81 and there is no longer any need to take account of the material of the workpiece 16 or 71 since a calibration is made to the total voltage 79.

The advantage of a speed measuring device of this type is that the welding speed of the welding torch 10 can be monitored by what is only an electronic method without the need for any additional external components other than the measurement contacts 73 to 75.

Clearly, any other method could be used to determine the welding speed of a welding torch 10 for a welding unit 1 of this type. For this purpose, it would also be possible to couple these methods with the control device 4 via an interface so that a direct exchange of data or data transfer can be run between the external device and the control device 4. Mechanical devices may also be provided on the welding torch 10 so that the welding speed could be determined on the basis of displacement of the welding torch 10. For this purpose, it would be possible to provide a spring-mounted wheel on the welding torch 10 so that the welding speed can be determined by the control device 4 on the basis of the rotating motion of the wheel as the welding torch 10 is displaced.

For the sake of good order, it should finally be pointed out that in order to provide a clearer understanding of the invention, individual components and groups of components have been illustrated out of proportion and out of scale.

Individual features from the individual examples of embodiments may be construed as independent inventive solutions in combination with individual features from other examples of embodiments or independently in their own right.

Above all, the examples of embodiments illustrated in the individual FIGS. 1; 2, 3; 4, 5, 6; 7 can be construed as independent solutions proposed by the invention. The tasks and solutions proposed by the invention can be found in the detailed descriptions relating to these drawings.

List of reference numbers

| | | | |
|---|---|---|---|
| 1 | Welding unit | 26 | Input device |
| 2 | Current source | 27 | Output device |
| 3 | Power component | 28 | Bus system |
| 4 | Control device | 29 | Memory device |
| 5 | Switching member | 30 | Line |
| 6 | Control valve | 31 | Inverter current source |
| 7 | Supply line | 32 | Supply line |
| 8 | Gas | 33 | Supply line |
| 9 | Gas storage | 34 | Voltage supply network |
| 10 | Welding torch | 35 | High-frequency generator |
| 11 | Wire feed device | 36 | Line |
| 12 | Supply line | 37 | Line |
| 13 | Welding wire | 38 | Measuring device |
| 14 | Supply drum | 39 | Shunt |
| 15 | Arc | 40 | Line |
| 16 | Workpiece | 41 | Line |
| 17 | Supply line | 42 | Converter |
| 18 | Supply line | 43 | Line |
| 19 | Coolant circuit | 44 | Line |
| 20 | Flow indicator | 45 | Line |
| 21 | Water container | 46 | Front plate |
| 22 | Input and/or output device | 47 | Setting member |
| 23 | Microprocessor controller | 48 | Main controller |
| 24 | Line | 49 | Display element |
| 25 | Line | 50 | Symbol |
| 51 | Welding current | 76 | Display element |
| 52 | Maximum temperature | 77 | Display element |
| 53 | Material thickness | 78 | Display element |
| 54 | Wire feed rate | 79 | Total voltage |
| 55 | Welding voltage | 80 | Part voltage |
| 56 | Arc length | 81 | Part voltage |
| 57 | Current rise | 82 | Arrow |
| 58 | Wire diameter | | |
| 59 | Gas mixture | | |
| 60 | Welding process | | |
| 61 | Additional functions | | |
| 62 | Memory element | | |
| 63 | Memory key | | |
| 64 | a-measurement | | |
| 65 | Welding speed | | |
| 66 | Display element | | |
| 67 | 7-segment display | | |
| 68 | 7-segment display | | |
| 69 | Fillet weld | | |
| 70 | Bead | | |
| 71 | Workpiece | | |
| 72 | Contact | | |
| 73 | Measuring contact | | |
| 74 | Measuring contact | | |
| 75 | Measuring contact | | |

What is claimed is:

1. Method of controlling a welding unit and a current source, in which various welding parameters can be set by a user via an input or output device, the set welding parameters being applied to a control device, after which the welding unit and the current source are activated by the control device in accordance with the pre-set welding parameters, various desired values for the different welding parameters being stored in a memory device, read by the control device and displayed on the input or output device when a welding method is retrieved, the desired values for at least one welding parameter of a welding method being stored in the memory device for the minimum and maximum values in the form of a minimum and maximum curve to create a three dimensional characteristic curve and, when a welding parameter falling between the minimum and maximum values or curves is retrieved or set, the control device determines the other desired values of the other welding parameters of this welding methods by means of an interpolation calculation.

2. Method as claimed in claim 1, wherein the threshold value for the possible welding settings on the welding unit are formed from the desired values for the stored minimum and maximum values or curves.

3. Method as claimed in claim 1, wherein the welding unit is configured independently and automatically by the control device on the basis of the determined other desired values.

4. Method as claimed in claim 1, wherein the minimum and maximum values or curves are derived from or associated with other welding parameters, depending on a welding parameter.

5. Method as claimed in claim 1, wherein in order to calculate the individual desired values via the input or output device, at least one welding parameter is pre-set, the other welding parameters of the minimum and maximum values or curves being adjusted thereto.

6. Method as claimed in claim 1, wherein the user edits the calculated desired values via the input or output unit.

7. Control device for a welding unit and a current source, comprising an input or output device connected to the control device, a memory device for storing operating data and a power component, desired values being stored in the memory device of the welding unit for the purpose of setting up a welding parameter or a welding process, the desired values being adjustable via the input or output device when retrieved or activated, and the desired values being made up of a plurality of minimum and maximum curves to create a three-dimensional characteristic curve.

8. Control device as claimed in claim 7, wherein different minimum and maximum curves for different welding processes are stored in the memory device.

9. Control device as claimed in claim 7, wherein the minimum and maximum curves are made up of several welding parameters.

10. Control device as claimed in claim 7, wherein the desired values of the minimum and maximum curves form the threshold values of the welding settings of the welding unit.

11. Control device as claimed in claim 7, wherein a minimum and maximum desired value for a welding parameter is stored in the memory device for the minimum and maximum curves, other welding parameters being derived from or associated with this welding parameter.

* * * * *